(12) United States Patent
Garcia-Huidobro Valdivieso

(10) Patent No.: US 9,272,652 B2
(45) Date of Patent: Mar. 1, 2016

(54) HOPPER BOX AND HOPPER CONSTRUCTED WITH A COLLAPSED AND ELONGATED LONGITUDINALLY CURVED C-SHAPED FLOOR

(75) Inventor: Alfredo Garcia-Huidobro Valdivieso, Santiago (CL)

(73) Assignee: ANSAR DISENO LIMITADA, Santiago (CL)

( * ) Notice: Subject to any disclaimer, the term of this patent is extended or adjusted under 35 U.S.C. 154(b) by 0 days.

(21) Appl. No.: 14/369,108

(22) PCT Filed: Sep. 6, 2012

(86) PCT No.: PCT/IB2012/054623
§ 371 (c)(1),
(2), (4) Date: Jun. 26, 2014

(87) PCT Pub. No.: WO2013/098664
PCT Pub. Date: Jul. 4, 2013

(65) Prior Publication Data
US 2014/0333090 A1    Nov. 13, 2014

(30) Foreign Application Priority Data
Dec. 30, 2011 (CL) .................................. 3363-2011

(51) Int. Cl.
*B60P 1/28* (2006.01)
(52) U.S. Cl.
CPC .. *B60P 1/286* (2013.01); *B60P 1/28* (2013.01)
(58) Field of Classification Search
CPC .............. B60P 1/04; B60P 1/28; B60P 1/283; B60P 1/286; B60P 3/40; B62D 33/00; B62D 33/02
USPC ......... 296/183.1, 183.2, 184.1; 298/11, 17 R, 298/24
See application file for complete search history.

(56) References Cited

U.S. PATENT DOCUMENTS

| 1,883,936 | A | * | 10/1932 | Kerr ........................... 296/183.2 |
| 2,465,899 | A | * | 3/1949 | Maxon, Jr. .................. 298/17 R |
| 2,490,532 | A | * | 12/1949 | Maxon, Jr. .................. 298/22 P |
| 4,230,254 | A | | 10/1980 | Proeschl |
| 6,935,678 | B1 | * | 8/2005 | Laban et al. ............... 296/183.2 |
| 2002/0180247 | A1 | | 12/2002 | Lombardi |

FOREIGN PATENT DOCUMENTS

| AU | 2010224359 | 4/2011 |
| CL | 0015-1999 | 1/1999 |
| CL | 0385-1996 | 4/2000 |

(Continued)

*Primary Examiner* — Jason S Daniels
(74) *Attorney, Agent, or Firm* — Muncy, Geissler, Olds & Lowe, P.C.

(57) ABSTRACT

A hopper box for a heavy lift truck such as mining trucks that minimizes the height of the gravity center of the load includes sheets that generate a floor, a front wall and two side walls. The sheets includes at least one sheet having a first longitudinal concave curved portion as a floor which continues with a longitudinal upper elongated portion which comprises the front wall thereby generating a single longitudinal curved, collapsed and elongated C-shaped sheet. A multiple number of such sheet may be provided and are placed in a juxtaposed manner until reaching the width by incorporating two side walls having on its lower face two longitudinal rigid U-shaped beams, wherein are also included half-round cross stiffeners on its ends.

11 Claims, 18 Drawing Sheets

(56) References Cited

FOREIGN PATENT DOCUMENTS

| | | |
|---|---|---|
| CL | 3486-2000 | 12/2000 |
| CL | 0327-2010 | 4/2010 |
| CL | 0241-2011 | 2/2011 |
| DE | 101 40 587 A1 | 6/2002 |
| EP | 1473189 | 11/2004 |
| WO | WO 99/22957 A1 | 5/1999 |
| WO | WO 02/49879 A2 | 6/2002 |
| WO | WO 2009/046488 A1 | 4/2009 |

* cited by examiner

HOPPER BOX AND HOPPER CONSTRUCTED WITH A COLLAPSED AND ELONGATED LONGITUDINALLY CURVED C-SHAPED FLOOR

TECHNICAL FIELD OF THE INVENTION

The present invention relates to a hopper box for heavy lift truck such as for example, mining trucks and the hopper formed by said box, which comprises a collapsed, elongated C-shaped sheet and two side walls, wherein said C-shaped surface constitutes the floor and front part of the hopper. This C-shaped surface can be made from three juxtaposed or overlapped sheets wherein the central, collapsed, elongated C-shaped sheet contains longitudinal beams, the tipping hinges and the components that relate said hopper with the truck chassis such that the more complex pieces and with more adjusted tolerances are found in the same plate sheet, thus avoiding several dimensional difficulties and of adjustment, inherent to the assembling process, particularly when said assembling must be performed at the mine or duty station.

The hopper for heavy lift truck such as a mining truck can be transported, divided into at least three portions such that a stacked package is obtained consisting of said at least three mentioned portions and which normally do not exceed the three-meter width in the case of mining trucks. Considering that the hopper box of the present invention can be transported with a width less or equal to three meters, it does not require police escort nor special authorization of road transport. This feature of being a package of three or less meters represents a major advantage regarding freight expenses and transport difficulties within the mining field.

BACKGROUND OF THE INVENTION

In the previous art, the heavy lift trucks hoppers such as for example, mining trucks, mainly are constituted by flat surfaces and a combination of varied types of beams which stiffen the planes forming the box container.

Also, there are hoppers of various proportions, curved, rigid and deformable of steel and rubber surfaces. All of them are curved in cross direction wherein a framework of beams also in a cross direction, in some cases rigid in others flexible, provide a structure supporting the curves of the sheet.

There are several patent documents disclosing sad types of hoppers. Thus, for example, document CL 3486-2000 published also as WO 02/49879 discloses a truck bed hopper of a mining dump truck that is capable of elastic deformation when it is subject to the loading or unloading of material, built preferably of structural or of wear steel, where the general structure of the bed hopper is curved. In this way, the great moments of inertia which are achieved with curved surfaces eliminate or reduce to a great extent the use of beams as main resistive elements. The present bed hopper has a protective blinder which is preferably cylindrical in shape and a frontal wall and floor are preferably elliptical in shape. The bottom of the bed hopper externally has a plurality of transversal beams which have the main function of keeping the bottom surface curved and transferring the strengths of the envelopment to the truck's body. Further, the bottom externally also has a plurality of support elements, preferably two in number, that are located at the front part, i.e., ahead of the rotation axis of the hopper. Said support elements only permit the support of the bed hopper on the truck's body and may be eliminated if the truck's body adapts itself to directly take in the transversal beams.

Document CL 0385-1996 discloses a mining hopper for transport of material comprising a structure formed by the hopper itself or a box integrally manufactured from a wear steel being itself the floor, the side walls and the front part, the only coating against abrasion and a reinforcement structure formed by a plurality of "T" beams arranged adjacent to the box, either longitudinal or in cross direction such that it can provide structural support to the box, structure which also is only made from wear material.

Document CL 0015-1999 discloses a high mobile efficiency box which structure framework is formed by "U" folded beams, constructed in six different types of steels, located in different zones according to the mechanical requirements; having a structural portion of its angle side cross members relative to the floor and with respect to the chassis and incorporating a zone in which the gases exiting the truck are taken advantage of making them pass through the structure formed by "U"-shaped beams, heating the containing box throughout all its surface.

Document CL 0873-2003 which was also published as EP 1473189 discloses a mining hopper aimed to transport sterile materials and ores having a mixed structure based on polymers and steels which constitute the body of the hopper for transporting the material. It comprises a floor, side walls, front section and side plates, visor and external areas manufactured of polymers or polymers parts.

Document CL 0327-2010 discloses a hopper to be installed on mining trucks, it comprises a V-shaped floor having curved ends, two side walls, a front wall and a visor, a plurality of H-shaped beams arranged in an horizontal, vertical and adjacent manner which form the framework, thus allowing to fix the floor, the two side walls, the front wall and the visor.

Document CL 1878-2009 also published as AU2010224359 discloses a folded hopper for a mining truck having a floor made of an anti-abrasive material which increases its resistance and simplifies manufacturing work, it is manufactured from special steels. Said anti-abrasive material is folded and of small thickness, with its sides folded, it only uses large beams on the sides.

Document CL 0241-2011 discloses an aerodynamic hopper for high tonnage trucks constructed with double beams in "1" which form a single structure for fixing the floor, the front section and side walls, a flat floor formed by a steel sheet attached to the beams, side walls, and front section formed by a S-shaped sheet and a visor attached to the front section and beams.

Document DE10140587 discloses a tipper body having a front wall, a protective shield, and a base of curved sections, consisting of a plurality of transverse bars, preferably 4-6 curved transverse bars on the base, and at least one curved transverse bar and two side bars on said protective shield. The curved surface of the shield is preferably cylindrical, and surfaces of shield and base are preferably elliptical. There are also two longitudinal support elements to support the tipper body on the truck chassis. The material for the body sections is wear-resistant steel or conventional steel.

Document US 2002/0180247 discloses a hopper box for use in off-road transport vehicle having rubber tires, it comprises a curved floor with a front part, rear part and a pair of side edges extending between the front part and the end part. The plant includes a lower surface adapted for the fundamental connection with the transport vehicle. Each one of the side walls includes a front part and each one of said side walls can be curved. A curved front wall is attached to the front part of the plant and to the front part of each one of the side walls. Therefore, the floor, side walls and front wall cooperate to define a useful cargo space.

Generally, throughout the previous art are described different types of hoppers in which the closest to the present invention are those which walls and floors have a concave curvature in cross direction of the hopper box.

SUMMARY OF THE INVENTION

The present invention relates to a hopper box and hopper for a heavy lift truck such as for example, a mining truck, which comprises continuous sheets which depending on its form constitute a curved floor and a frontal plane without producing angular joints between them. Two side planes are attached, on its upper face with respect to these sheets which are formed as a single piece and having a "C" shape and on its lower face, are attached two "U" shape longitudinal rigid beams which contribute to maintaining the resultant body within a container able to contain the material to be transported and to relate this body with the supporting truck. The hopper of the present invention includes on its rear end a half-round cross stiffener including in some cases half-round cross stiffeners in places different to the end. In addition, it can include a visor that can be straight or concave in its longitudinal or cross direction, or else, convex in its longitudinal or cross direction. There may be cases as in highway heavy lift trucks in which this visor is not needed.

One of the main features of this invention is that the hopper for the mining truck, by virtue of its shape, where the floor is longitudinally curved, lifting itself towards the rear part, allows to create a very low gravity center of the load and in turn, to safely keep a greater distance with respect to the waste bench during dump. Normally, in the previous art, these features are incompatible and the improvement of one worsens the other and vice versa.

This hopper for the heavy lift truck on its central sheet formed by a collapsed, elongated single C-shaped piece contains the longitudinal beams, the tipping hinges and the components relating this body with the truck chassis such that the pieces of greater complexity and more adjusted tolerances are found in the same sheet, thus avoiding several of the dimensional and adjustment complications of the assembly itself. Particularly, when said assembly must be performed at the mine or at a duty station.

A first objective of the present invention is providing a hopper that minimizes the height of the gravity center of the load without compromising the necessary site clearing that has to be maintained with respect to the waste bench during the load dump.

A second objective of the present invention is providing a hopper of simple construction having minimum welding joints where the construction complexities are centered on a central sheet of easy dimensional control. The side bodies of this hopper can be attached to the central sheet without needing dimensional adjustments that require skilled labor during the assembly of complex structures.

A third objective of this invention is providing an easy-to-transport hopper with the subsequent cost saving that this implies.

A fourth objective of the present invention is providing a hopper having a few structure elements, thereby concentrating the greater efforts on two longitudinal beams. These structure elements are the side walls and the longitudinal "U"-shaped beams which serve to support the hopper on the truck. These structural elements have the advantage that are the same elements that already exist and are used with the trucks of the aforementioned previous art, and which are used in this case with a second functionality, which is to be the main structure of the hopper.

In order to comply with these objectives, the hopper of the present invention has a concave floor in a longitudinal direction wherein the floor is lift towards its rear end where its circular floor allows to increase the distance therefrom with respect to the waste bench during the dump while keeping the gravity center comparatively low being said hopper constituted by steel sheets formed in longitudinal direction without having an angle joint between the front plane and radial curve forming the floor and where its container box has a C-shaped surface having two side planes. This hopper concentrates all structural efforts on two longitudinal rigid beams which comply a double function of keeping the body shape and supporting the hopper on the truck chassis and can be assembled from one, two, three or more bodies which width is lower or equal to three meters.

Due to its concave floor arranged in longitudinal direction, a progressive discharge of material is produced during the dump such that the surface exposed to wear is minimized because it concentrates on its rear edge and wherein said concave floor arranged in longitudinal direction allows to decrease the general thickness of the floor considering that the material does not slide simultaneously. Thus it will be enough to strengthen the rear discharge edge in order to avoid the untimely wear of the sheet.

The collapsed and elongated "C" shape of the plates allow separating the upper structures of the sheet from the lower structures thereof such that its construction is significantly simplified and thereby reducing its construction cost wherein said plates after being attached to each other, are provided with half-round cylindrical stiffeners which are simpler than welded or folded beams.

The curved floor and the half-round stiffeners minimize the quantity of linear meters of welding and subsequently its associated cost.

BRIEF DESCRIPTION OF THE FIGURES

The enclosed figures which are included to provide a greater comprehension of the invention are incorporated and constitute part of this specification, illustrate one of the embodiments of the invention.

DESCRIPTION OF THE INVENTION

The present invention relates to a hopper box for a heavy lift truck such as for example mining trucks and the hopper formed by said box, which is constituted by at least one C-shaped sheet, more commonly three, two lateral ones and one central wherein the central sheet contains the longitudinal beams such that the pieces of greater complexity and of more adjusted tolerances are found in the same sheet, thus avoiding several of the dimensional and adjustment complications of the assembly itself.

An example of this invention is the hopper for the mining truck which can be transported divided into three longitudinal portions such that is obtained a stacked package constituted by the three mentioned portions and which normally do not exceed the three-meter width.

Figure 1:
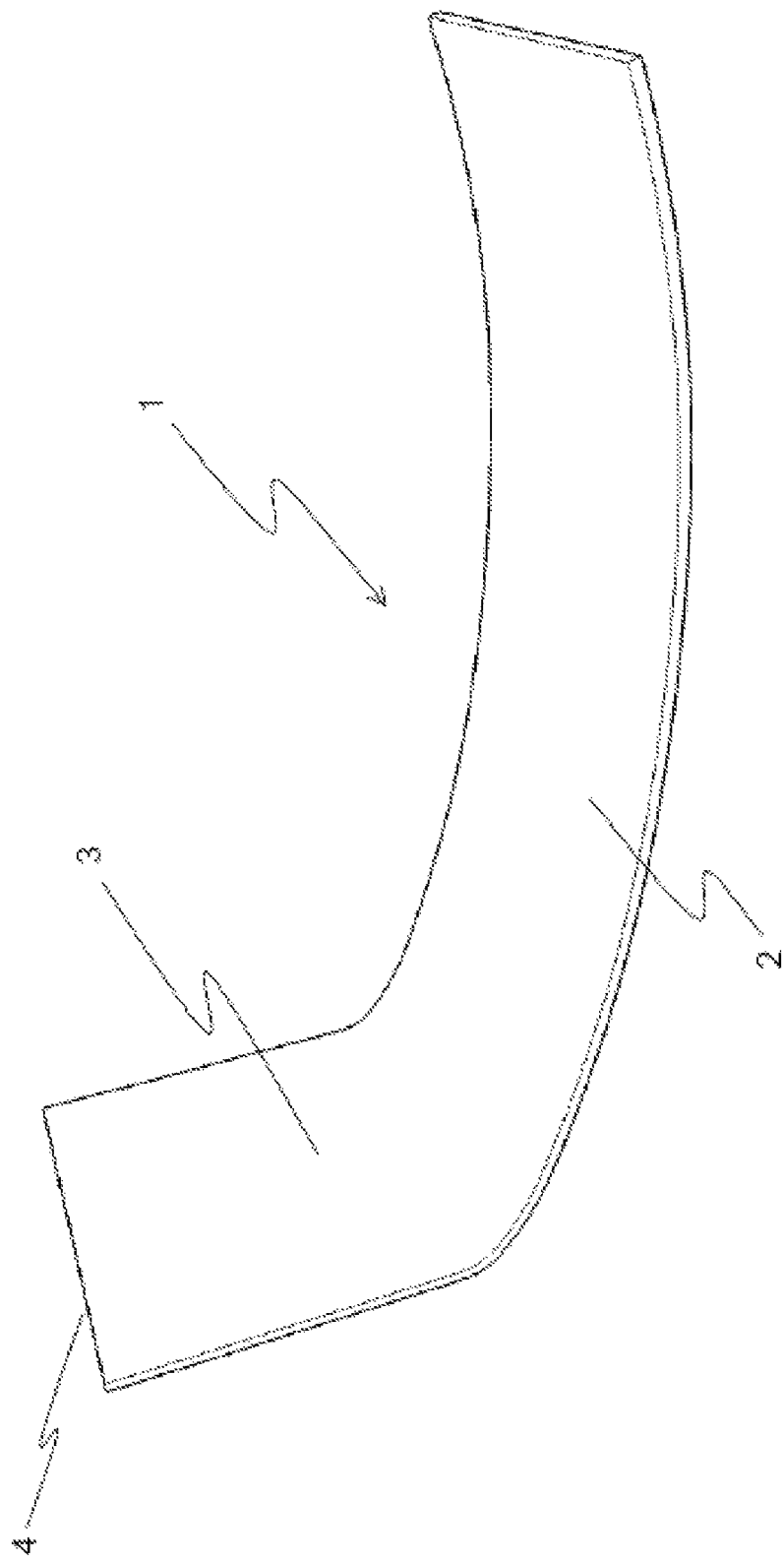
FIG. 1 shows an upper perspective view of the C-shaped sheet to form the hopper box of the present invention.

As shown in FIG. 1, the hopper box of the present invention is formed by a sheet (1) which has a first longitudinal curved concave portion (2) as a floor, which connects to a longitudinal elongated C-shaped portion that forms the frontal wall (3) thereby generating a single collapsed and elongated C-shaped sheet having a longitudinal lower concave elongated base.

Figure 2:
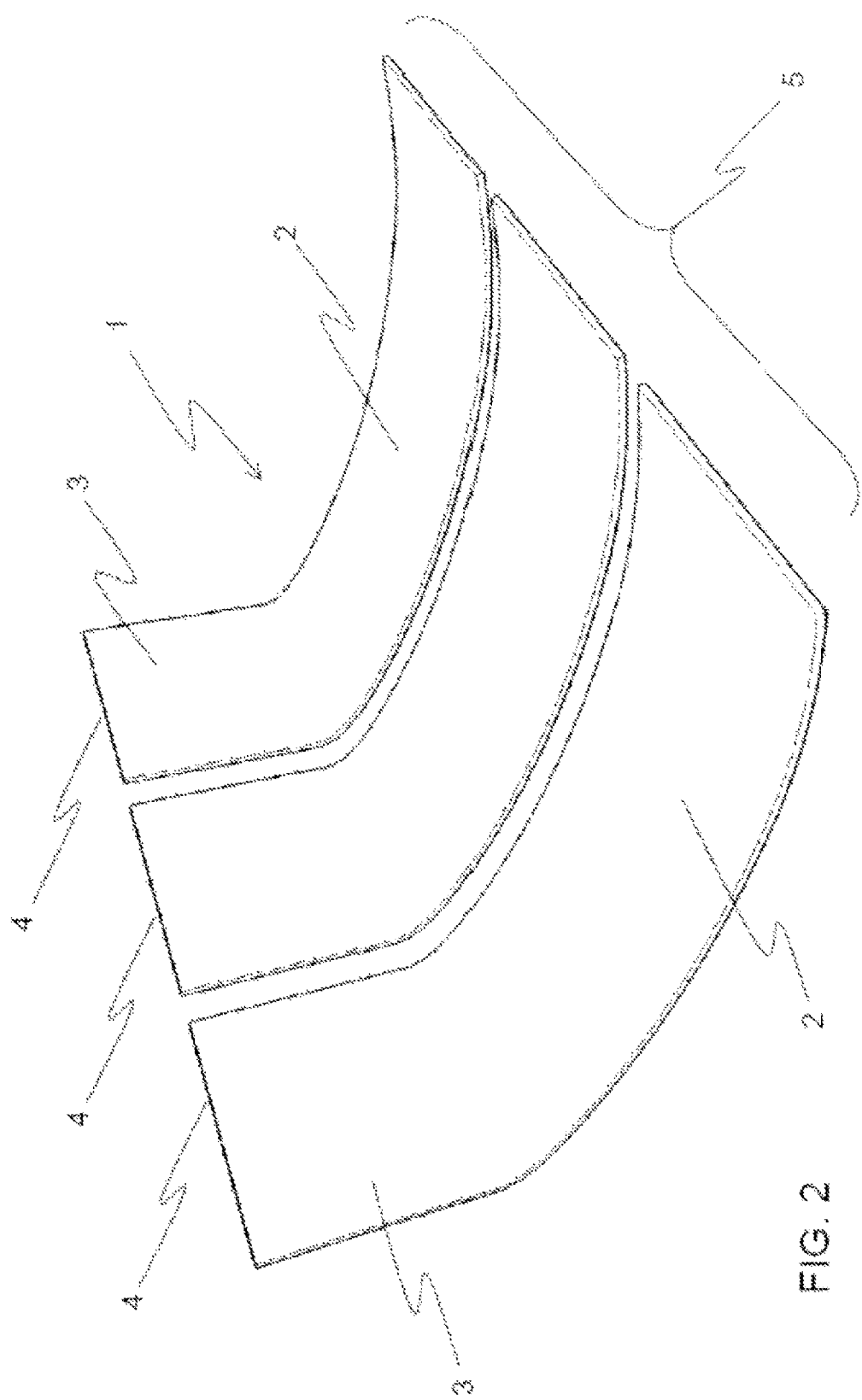
FIG. 2 shows an upper perspective view of three juxtaposed C-shaped sheets to form the hopper box of the present invention.

In order to form a hopper box of a great width, at least three plates are placed in a juxtaposed manner until reaching the desired width (5), for example, 9 meters in the case of mining hoppers according to FIG. 2 where a hopper having more than three-meter width is required.

Figure 3:
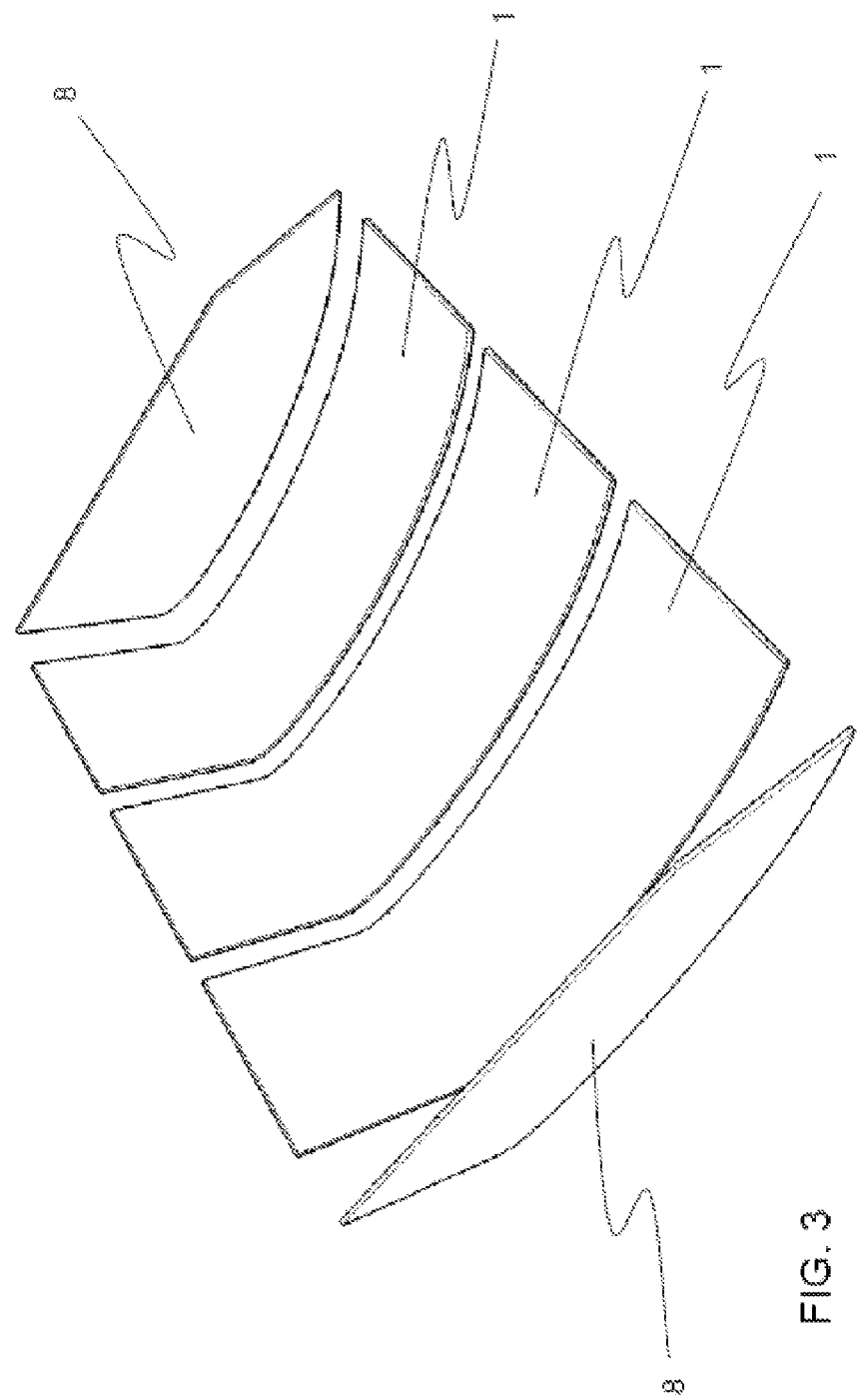
FIG. 3 shows an upper perspective view of three juxtaposed C-shaped sheets and with side walls to form the hopper box of the present invention.
Figure 4:
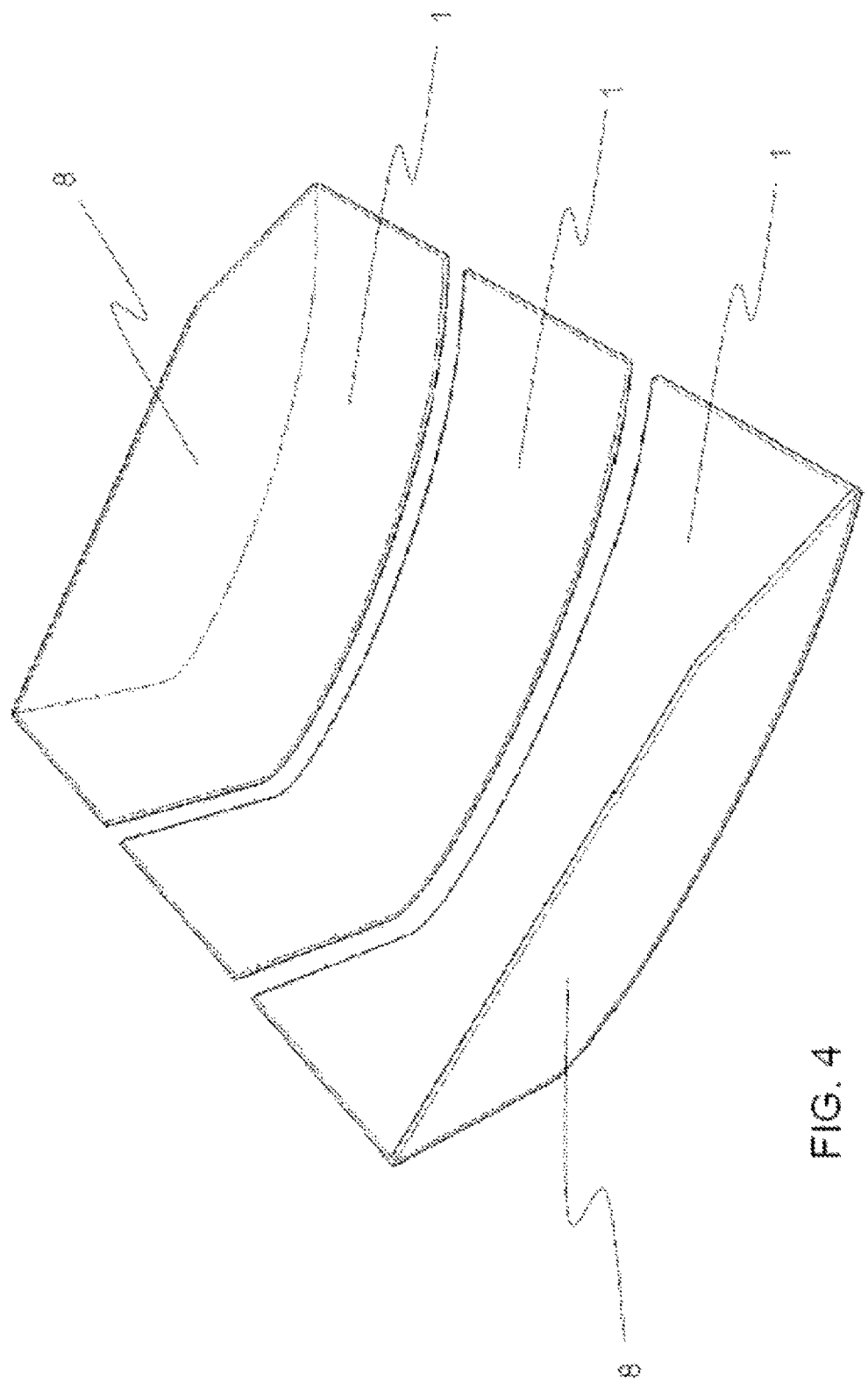
FIG. 4 shows an upper perspective view of three juxtaposed C-shaped sheets and with the side walls welded to the exterior sheets to form the hopper box of the present invention.

FIGS. 3 and 4 show the form of one of the preferred embodiments of this invention that is for example, the hopper of a mining truck. Said figures show three sheets (1) that are placed in a juxtaposed manner and the side walls are welded to the side sheets.

Figure 5:
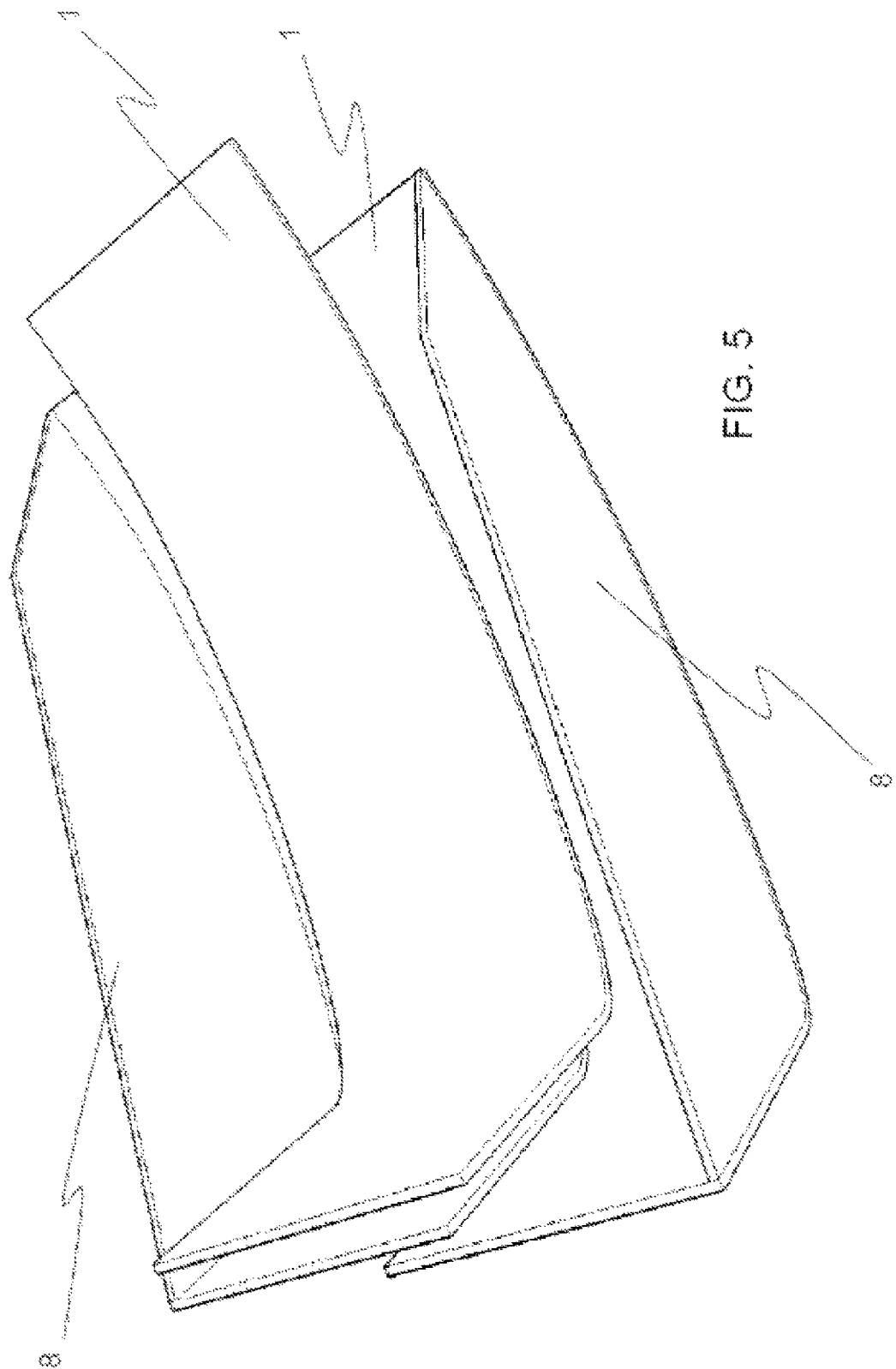
FIG. 5 shows an upper perspective view of three C-shaped sheets and side walls stacked for the transport of the hopper box of the present invention.

One of the advantages of this embodiment is that this hopper box can be transported in a stacked manner, one on top of the other as shown in FIG. 5. The sheets (1) with the side walls (8) are overlapped and above or under them the central sheet is placed.

When the stack of sheets arrives to the site, these are joined by means of conventional methods such as welding or perforations with through bolts.

Figure 6:
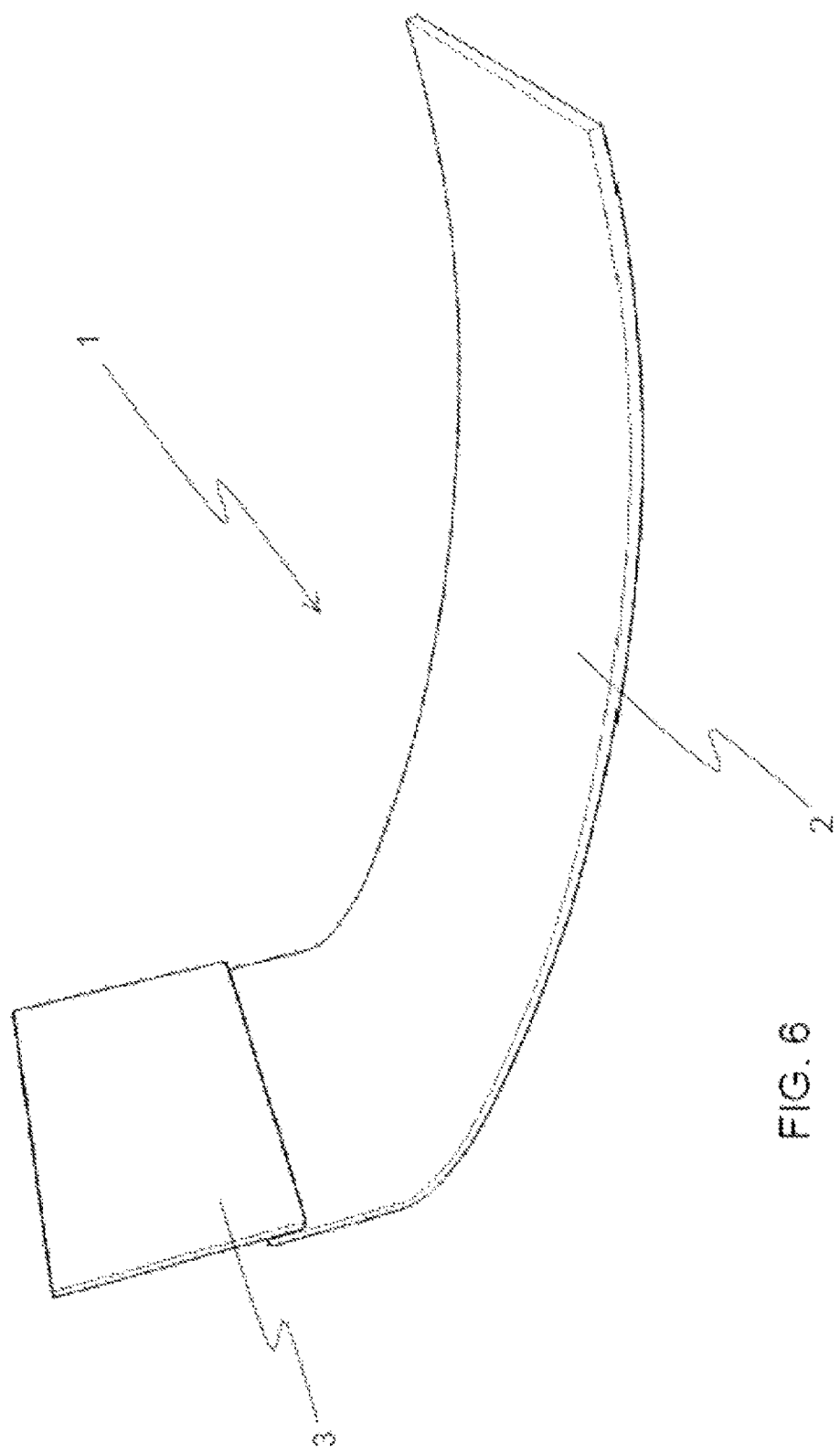
FIG. 6 shows an upper perspective view of a plate to form a sheet forming a C-shaped profile hopper box and a first embodiment of a front wall of the present invention.
Figure 7:
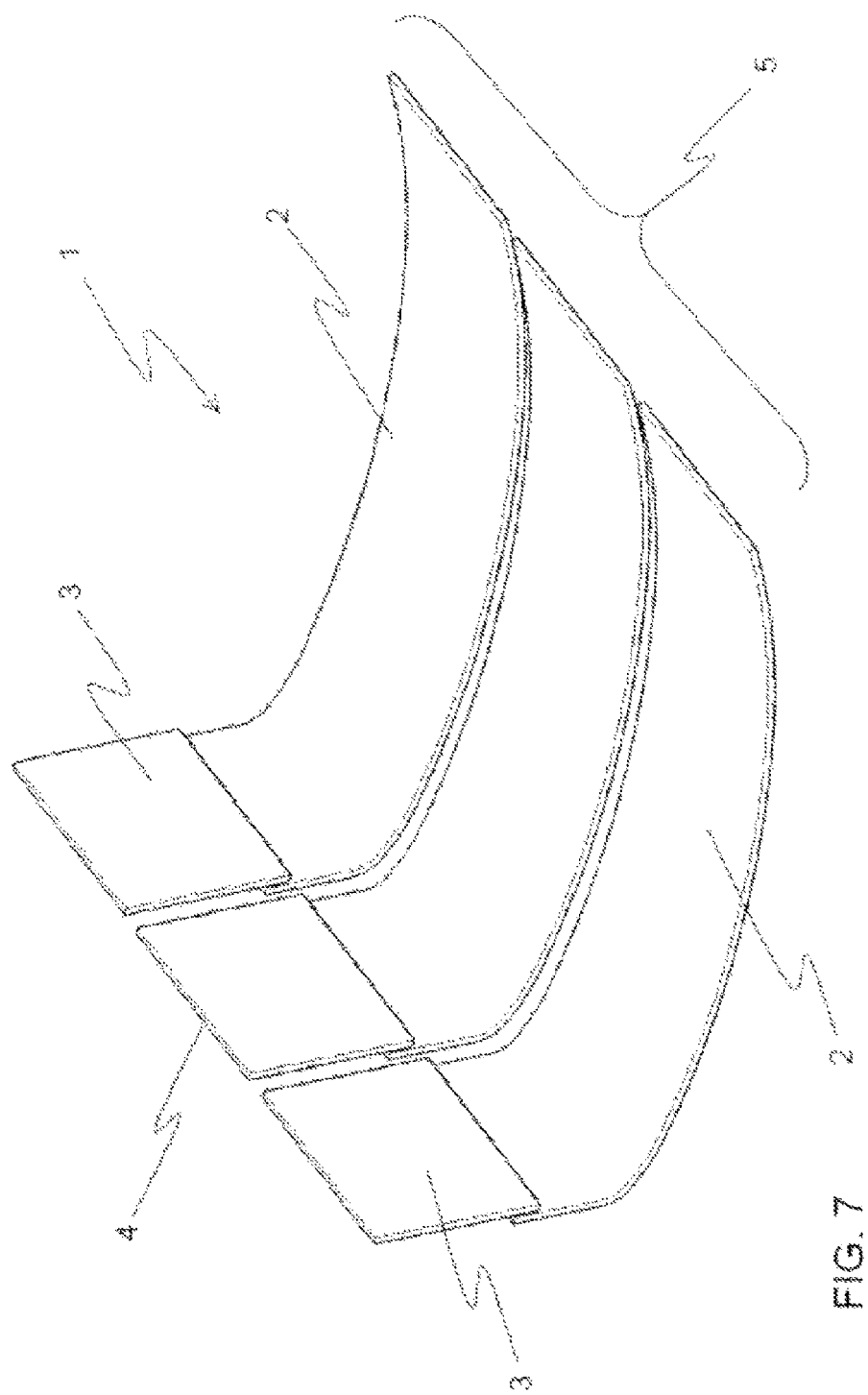
FIG. 7 shows an upper perspective view of three sheets formed by a sheet forming a C-shaped profile hopper box and a first embodiment of a front wall of the present invention.

Alternatively, a hopper can be formed by two sheets mounted in an overlapped manner as showed in FIGS. 6 and 7. In this case, the hopper box is formed by at least two sheets, a first longitudinal curved, concave collapsed and elongated C-shaped sheet (2) as a floor, which connects and overlaps with a second straight sheet which forms the front wall (3).

Figure 8:
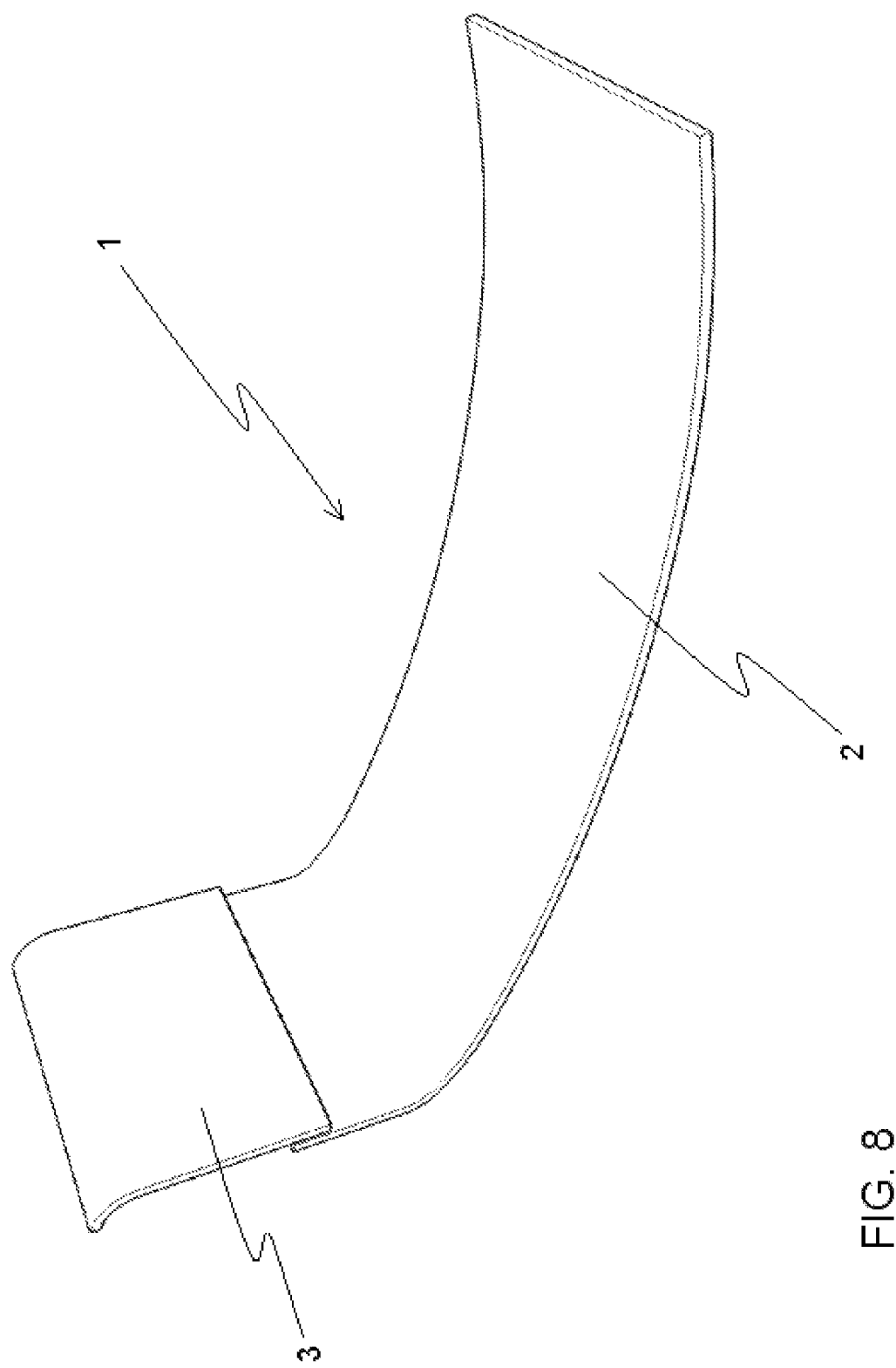
FIG. 8 shows an upper perspective view of a plate to form a sheet forming a C-shaped profile hopper box and a second embodiment of a front wall of the present invention.
Figure 9:
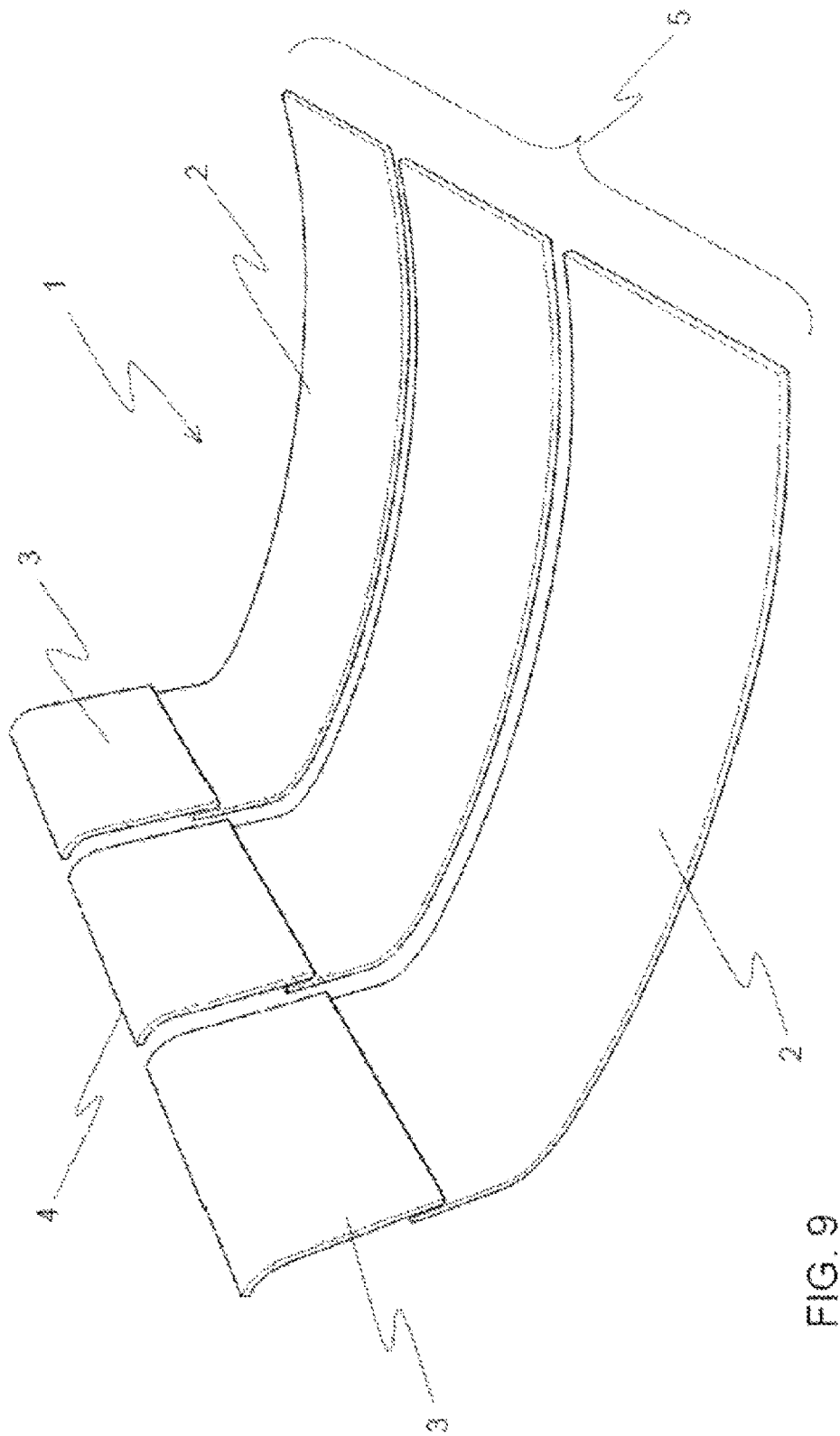
FIG. 9 shows an upper perspective view of three sheets formed by a sheet forming a C-shaped profile hopper box and a second embodiment of a front wall of the present invention.

Another alternative to the previous one, is a hopper that is formed by two sheets mounted in an overlapped manner as showed in FIGS. 8 and 9. In this case, the hopper box is formed by at least two sheets, a first longitudinal curved, concave collapsed and elongated C-shaped sheet (2) as a floor, which connects and overlaps with a second curved convex sheet in a longitudinal direction which forms the front wall (3).

Figure 10:
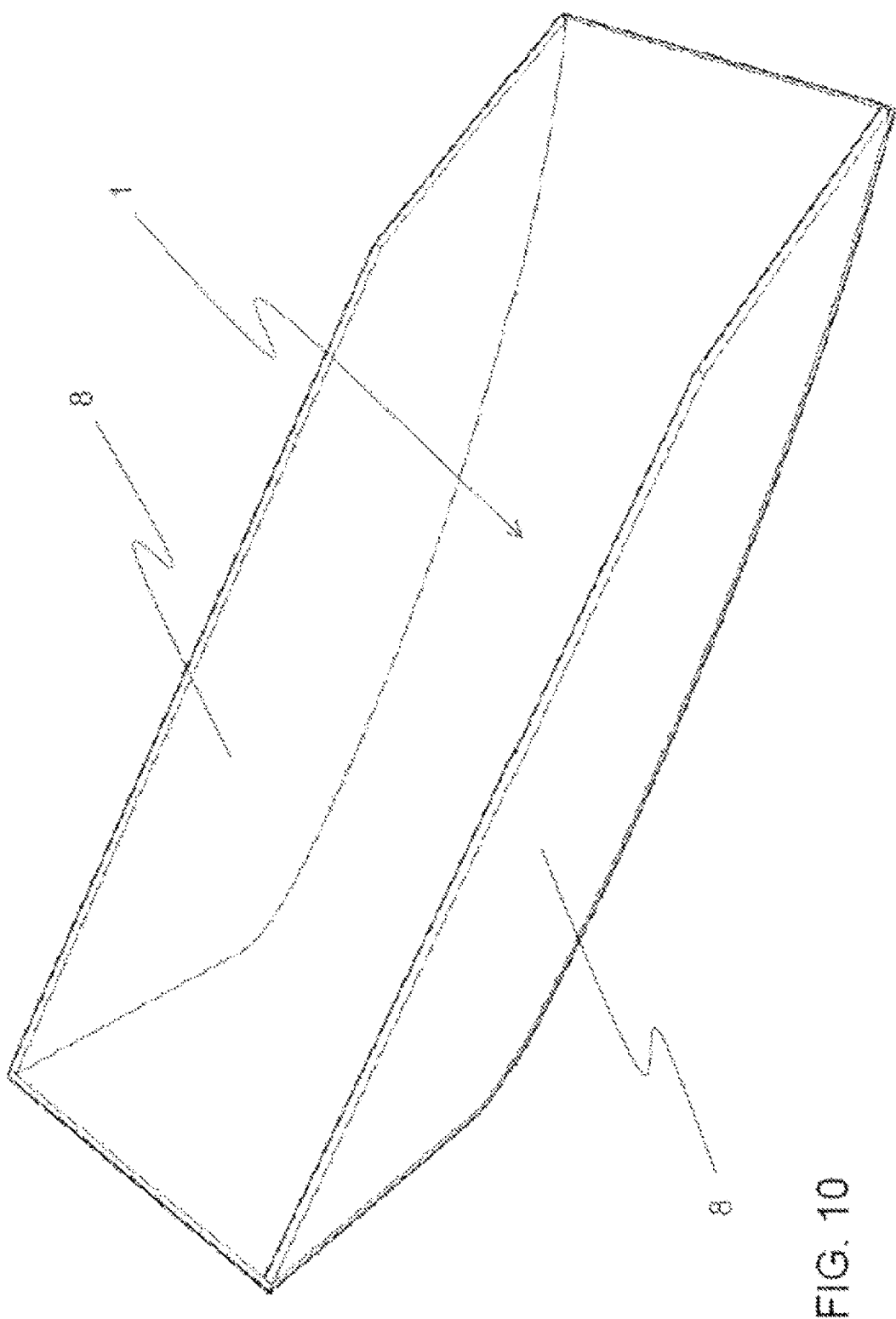
FIG. 10 shows an upper perspective view of an embodiment of the hopper box having a single C-shaped sheet of the present invention.
Figure 11:
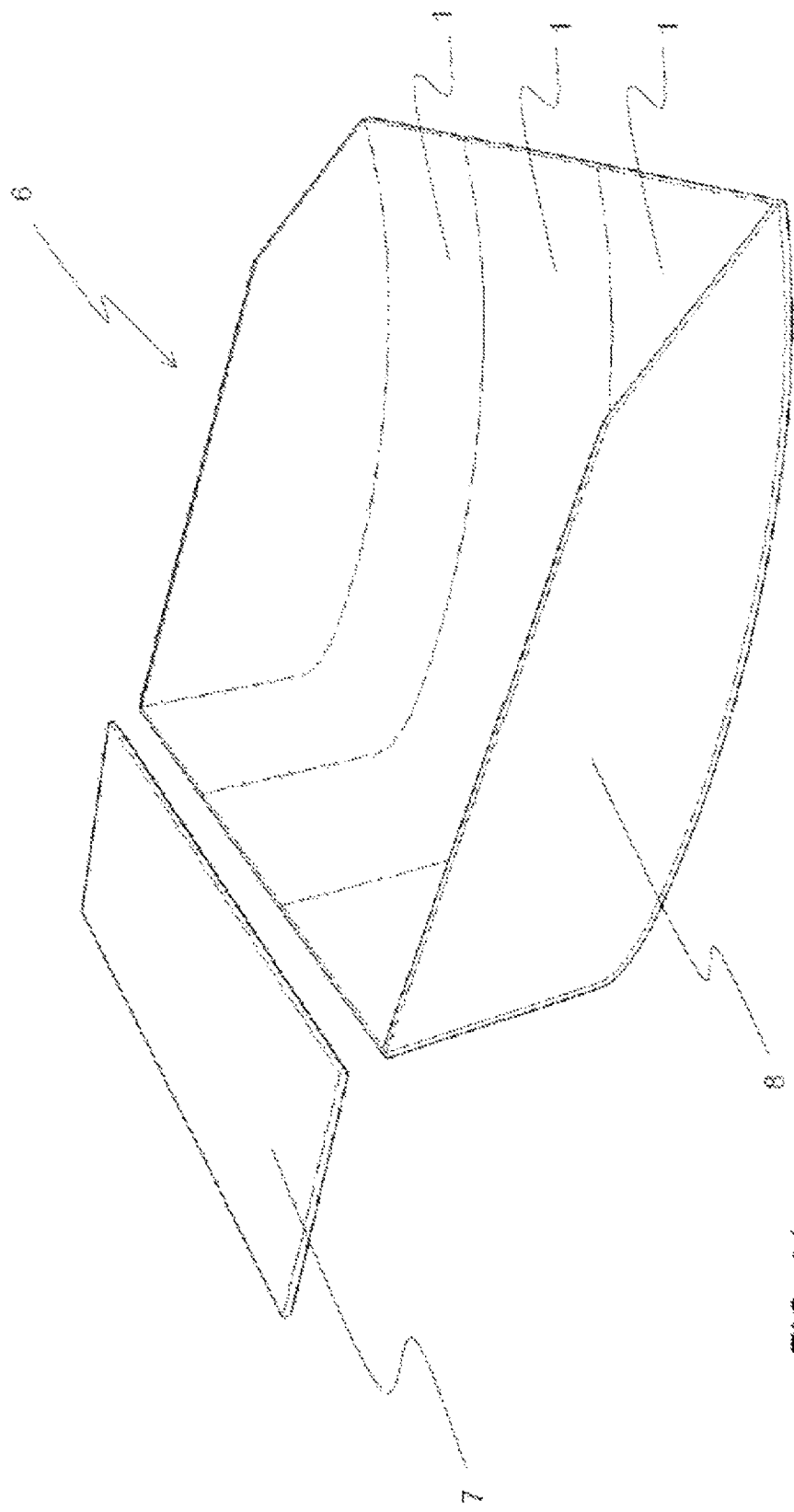
FIG. 11 shows an upper perspective view of three sheets (1) and a first embodiment of a visor to form the C-shaped profile hopper of the present invention.
Figure 12:
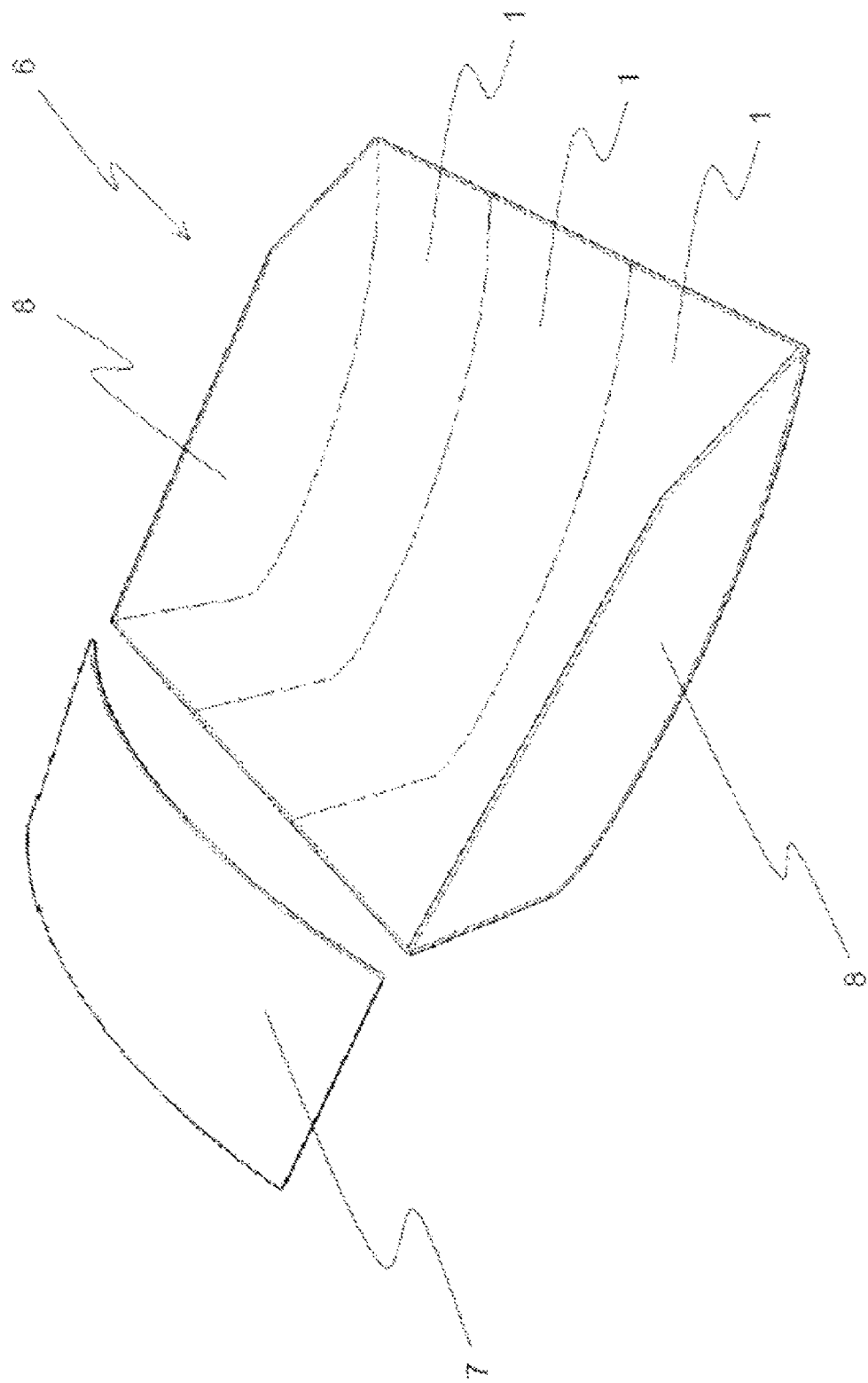
FIG. 12 shows an upper perspective view of three sheets (1) and a second embodiment of a visor to form the C-shaped profile hopper of the present invention.
Figure 13:
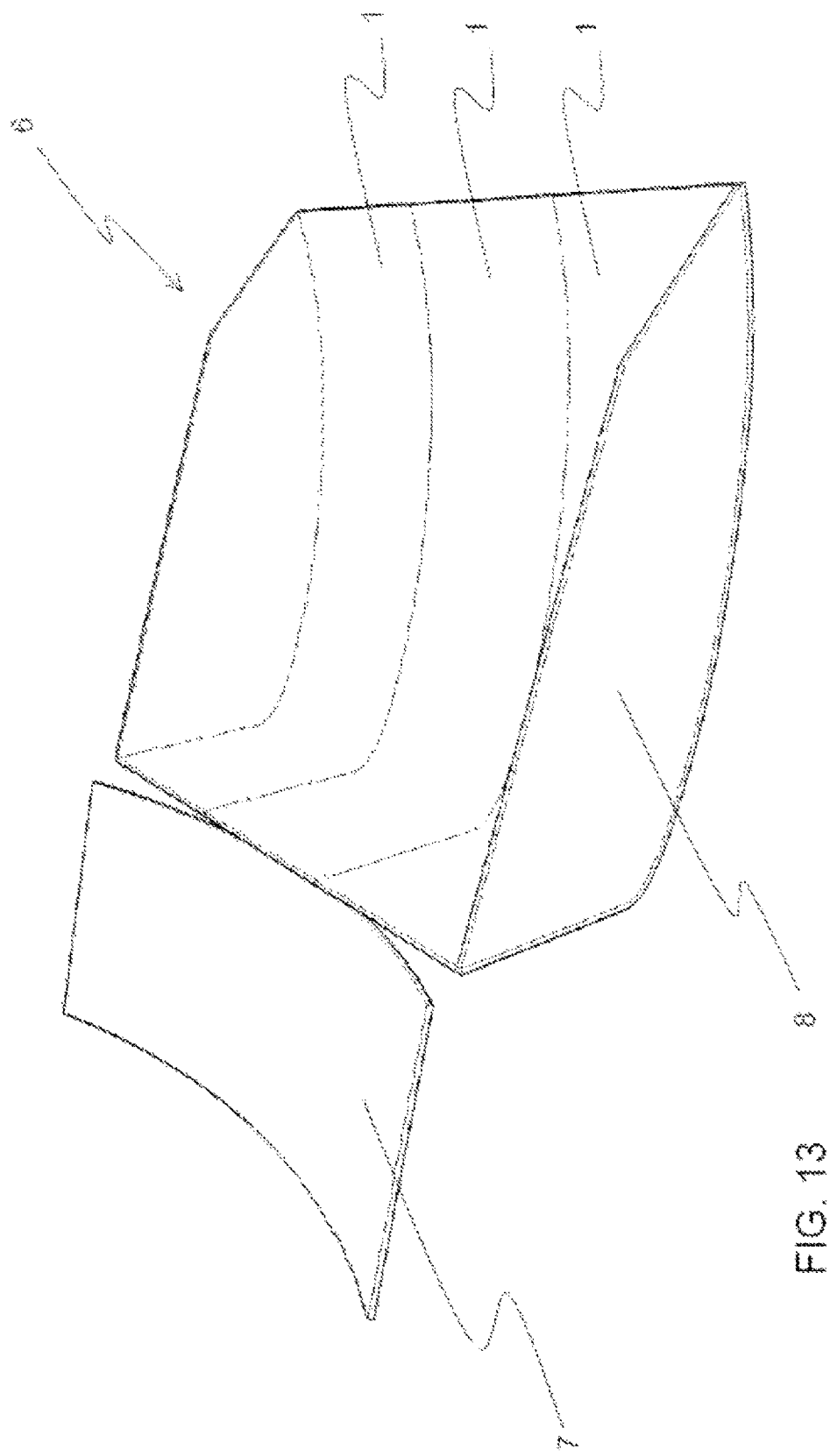
FIG. 13 shows an upper perspective view of three sheets (1) and a third embodiment of a visor to form the C-shaped profile hopper of the present invention.
Figure 14:
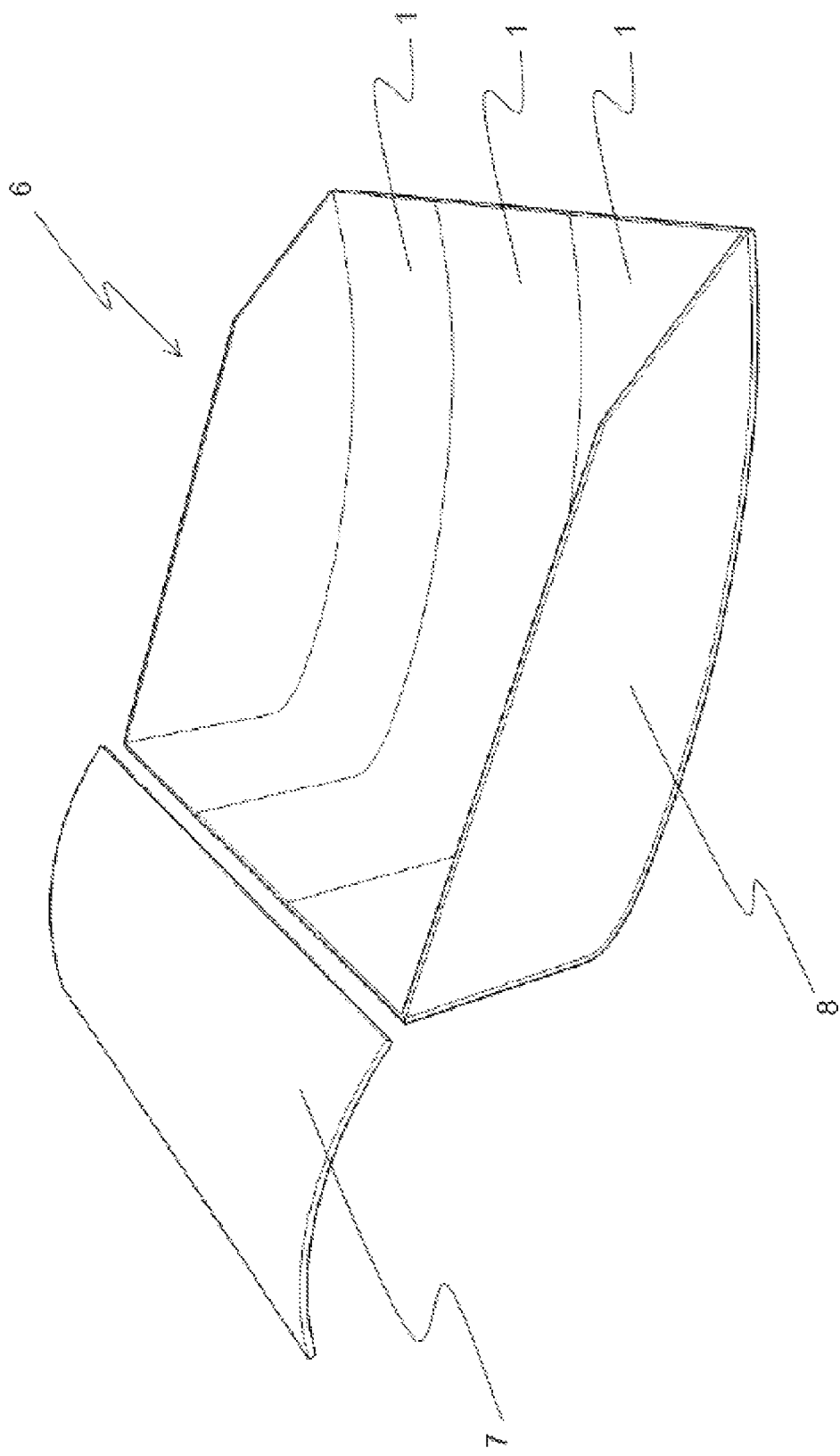
FIG. 14 shows an upper perspective view of three sheets (1) and a fourth embodiment of a visor to form the C-shaped profile hopper of the present invention.

As an example, in FIG. 10 is shown a hopper box formed by a single collapsed and elongated C-shaped plate wherein its two side walls have been welded. This embodiment has application in heavy lift trucks which pass for instance by intercity routes.

Figure 15:
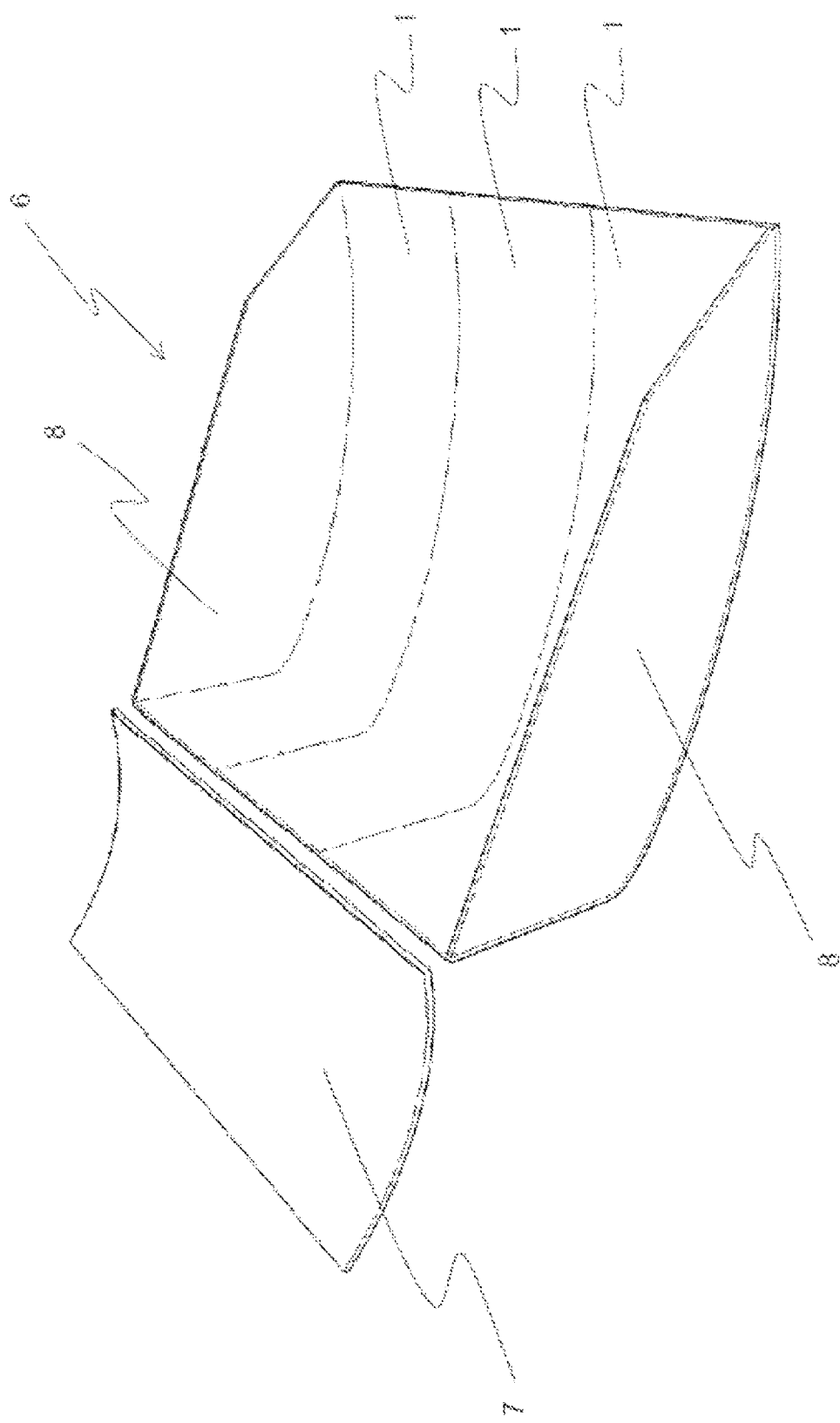
FIG. 15 shows an upper perspective view of three sheets (1) and a fifth embodiment of a visor to form the C-shaped profile hopper of the present invention.

FIGS. 11 to 15 show a hopper box forming a hopper (6) comprised by at least one sheet (1) which connects in an overlapped manner with a sheet of a straight type (7) which forms the visor of a hopper (FIG. 11) for the truck cab. This last sheet can be, alternatively, of a convex shape in its cross direction (FIG. 12), concave in its cross direction (FIG. 13), convex in its longitudinal direction (FIG. 14) and curved concave in its longitudinal direction (FIG. 15).

Figure 16:
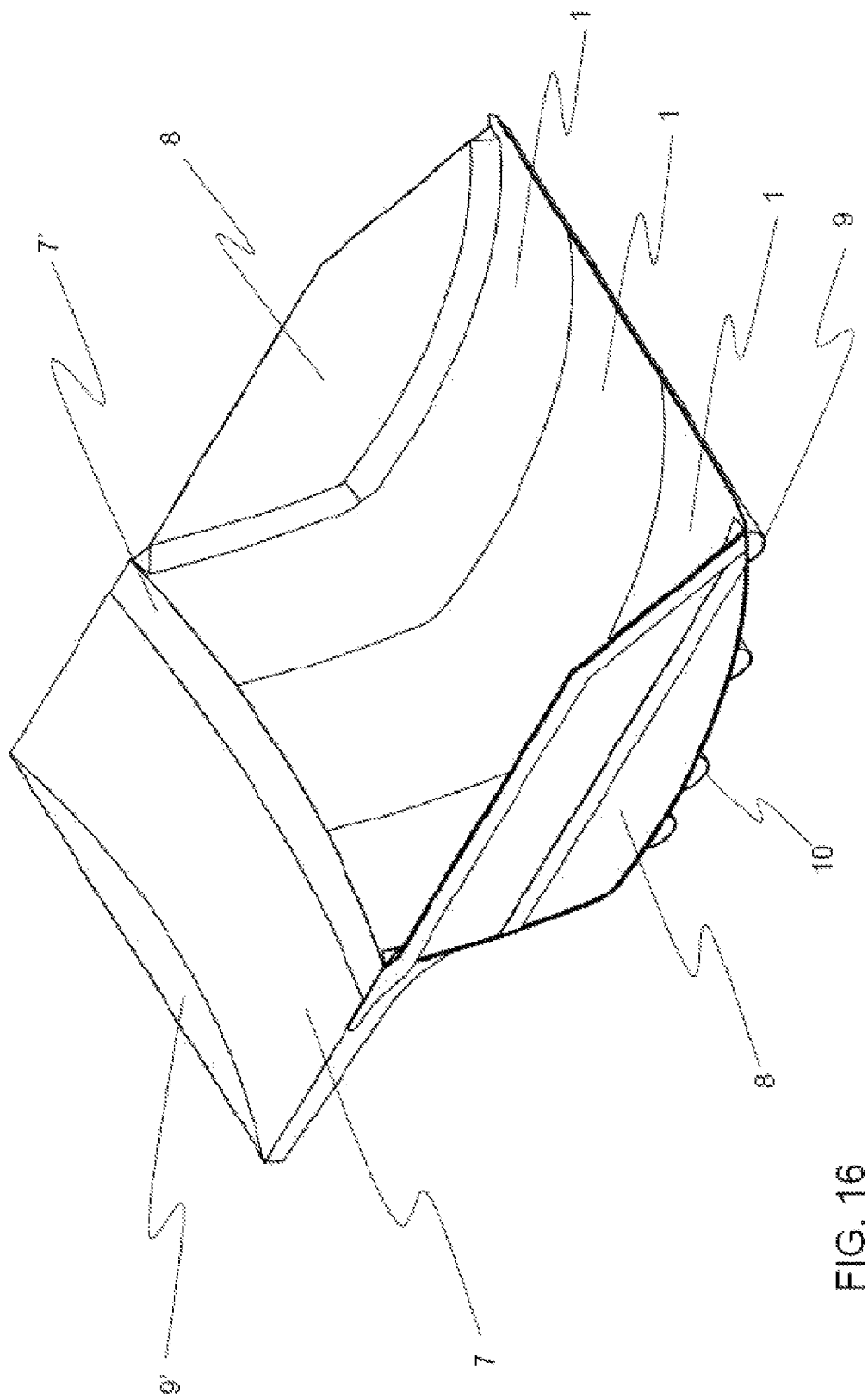
FIG. 16 shows an upper perspective view of the hopper of the present invention.

As well as in the case of the formation of the hopper box, the multiple sheets (6) are placed in a juxtaposed manner until reaching the width (5) and then they are joined by means of methods known in the state of the art, such as welding or perforations with through bolts, thus obtaining the formation of the floor, front wall and visor of the hopper as shown in FIG. 16.

Figure 17:
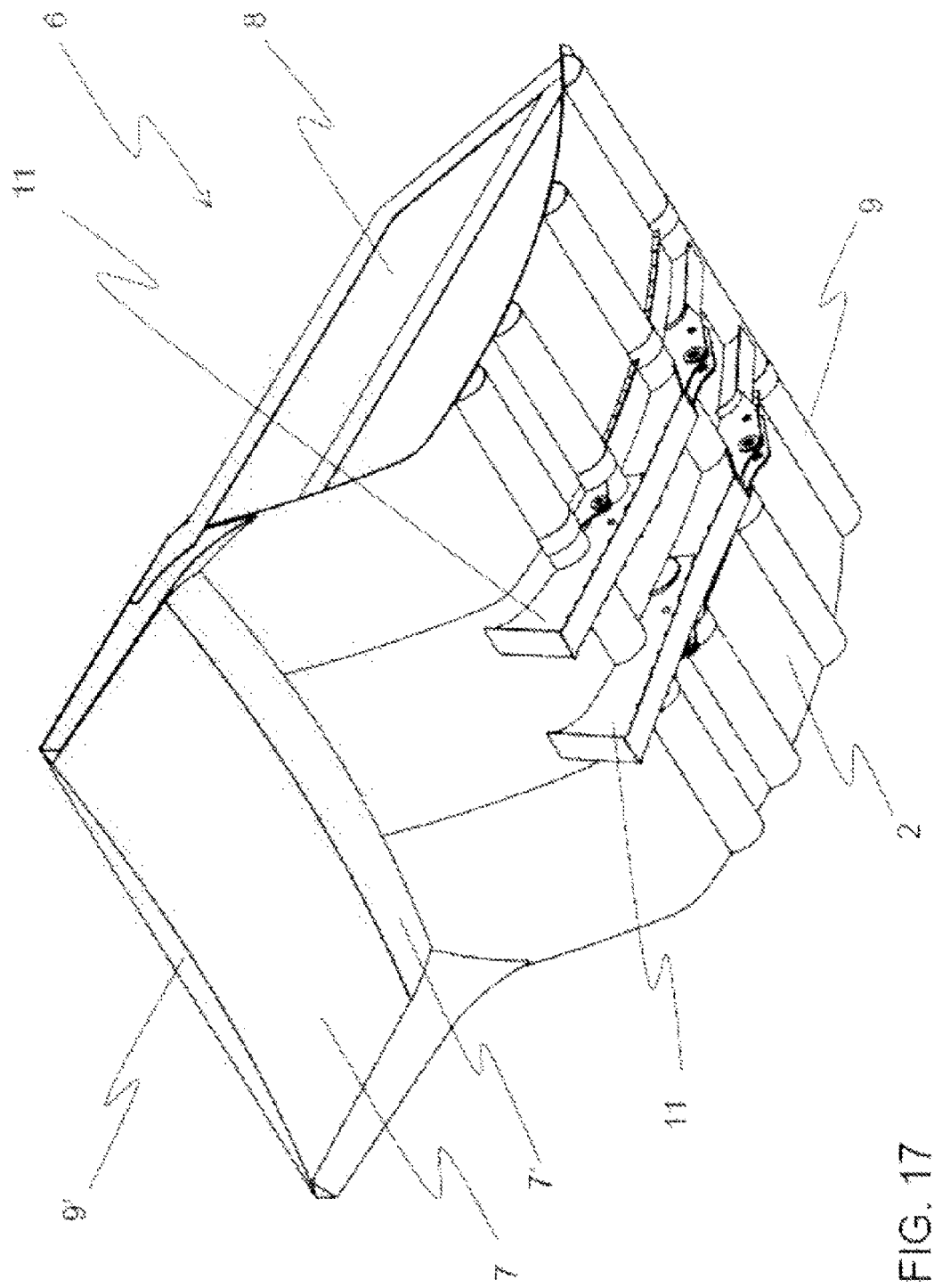
FIG. 17 shows a lower perspective view of the hopper of the present invention.
Figure 18:
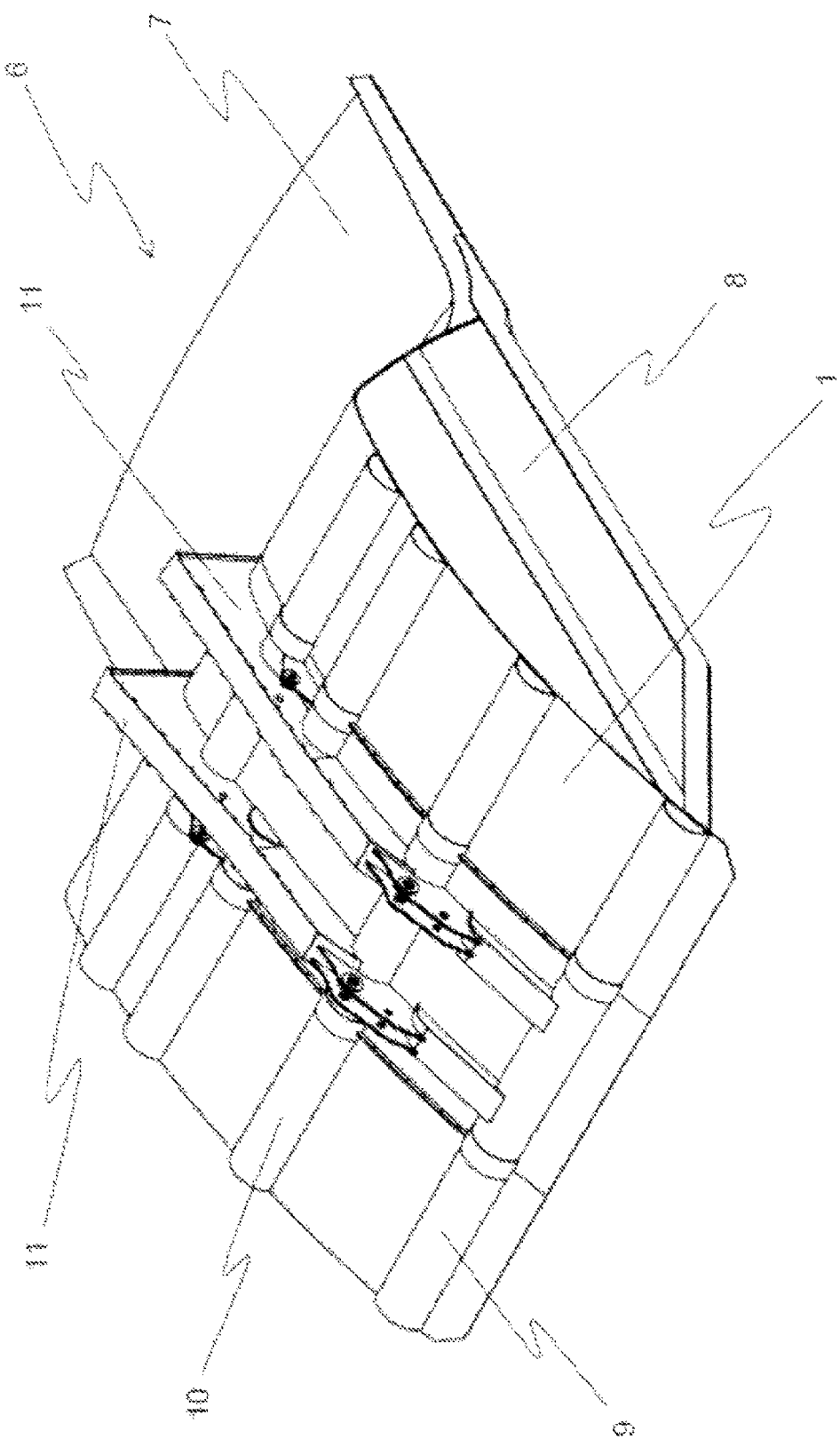
FIG. 18 shows a lower inverted perspective view of the hopper of the present invention.

As shown in FIGS. 17 and 18 on the lower face of the hopper there are two longitudinal rigid U-shaped beams (11) which contribute maintaining the the resultant body in a container able to contain the material to be transported and to relate this body with the truck supporting the hopper, which includes cross stiffeners (9). When the visors of the hoppers have a curve such as for example a concave curve as shown in FIGS. 16 and 17, one of the stiffeners can be a croissant-shaped sheet or similar (9'). Similarly, in some cases, it will be necessary, depending on the construction and transport, to extend the visor of an additional plate (7') located between the hopper and the visor (7). Depending on the requirements of the load, the hopper in some case includes cross stiffeners in places different to the rear end.

Both the hopper box having at least one sheet (1) and the hopper having at least one multiple sheet (FIG. 6) are supported by a structure formed by the two longitudinal rigid U-shaped beams (11), the cross stiffeners (9) and the straight side walls (8). By means of this single structure and according to the application of the hopper is possible that no cross stiffeners are required in places different to the ends (10) or else, that they are minimized.

The invention claimed is:

1. A hopper box for a heavy lift truck wherein said hopper box minimizes a height of a gravity center of a load; to safely keep a distance with respect to a waste bench during dump; and minimize the support structure; the hopper box comprising sheets that generate a floor, a front wall and two side walls, wherein the sheets include at least one sheet having a first longitudinal concave curved portion as the floor which continues with a longitudinal upper elongated portion comprising the front wall formed as a single longitudinal curved collapsed and elongated C-shaped sheet, wherein said at least one sheet is placed in an overlapped manner until reaching a width incorporating the two side walls, the floor having on its lower face two longitudinal rigid U-shaped beams, which also include a half-round cross stiffener on a rear end, and wherein said hopper box having said at least one sheet is supported by a structure formed only by said two longitudinal rigid U-shaped beams, said cross stiffener and said side walls.

2. The hopper box for a heavy lift truck according to claim 1, further comprising half-round cross stiffeners in places different from the rear end.

3. The hopper box for a heavy lift truck according to claim 1, wherein said at least one sheet includes at least two sheets that are placed in a juxtaposed manner until reaching a required width.

4. A hopper for a heavy lift truck wherein said hopper minimizes a height of a gravity center of a load, to safely keep a distance with respect to a waste bench during dump; and minimize the support structure; the hopper comprising sheets generating a floor, a frontal wall, two side walls and a visor, wherein the sheets include at least one sheet which has a first longitudinal curved concave portion as the floor which continues with a longitudinal upper elongated portion which forms the frontal wall forming a single longitudinal curved collapsed and elongated C-shaped sheet, wherein said at least one sheet is placed in an overlapped manner until reaching a width by incorporating the two side walls, the floor having on its lower face two longitudinal rigid U-shaped beams, which also include half-round cross stiffeners on rear ends, and wherein said hopper having the at least one sheet is supported by a structure formed only by said two longitudinal rigid U-shaped beams, said cross stiffeners and said side walls.

5. The hopper for a heavy lift truck according to claim 4, further comprising cross stiffeners in places different from the rear ends.

6. The hopper box for a heavy lift truck according to claim 4, wherein said at least one sheet includes at least two sheets that are placed in a juxtaposed manner until reaching a required width.

7. The hopper for a heavy lift truck according to claim 4, wherein the visor is a straight sheet.

8. The hopper for a heavy lift truck according to claim 4, wherein the visor has a convex shape in its cross direction.

9. The hopper for a heavy lift truck according to claim 4, wherein the visor has a concave shape in its cross direction.

10. The hopper for a heavy lift truck according to claim 4, wherein the visor has a convex shape in its longitudinal direction.

11. The hopper for a heavy lift truck according to claim 4, wherein the visor has a curved, concave shape in its longitudinal direction.

* * * * *